UNITED STATES PATENT OFFICE.

GUSTAV SCHWARZWALD, OF NEW YORK, N. Y.

COMPOSITION FOR PRINTING TEXTILE FABRICS.

SPECIFICATION forming part of Letters Patent No. 240,467, dated April 19, 1881.

Application filed August 14, 1878.

*To all whom it may concern:*

Be it known that I, GUSTAV SCHWARZWALD, of New York city, county and State of New York, have invented a new and Improved Composition for Printing Textile Fabrics, of which the following is a specification.

This invention relates to a new composition for printing textile fabrics—such as cotton goods, paper, &c.—by which a bright silk or satin like appearance will be imparted to such fabrics without injuring or weakening the same.

I prepare my improved composition in the following manner, and in about the proportions hereinbelow given: I mix, say, one pound of almond-shells with five ounces of cork, and grind the mixture in suitable manner; or I use, instead, eleven ounces of almond-shells, which are ground. I then boil the compound in water, allowing the water to gradually evaporate. The residue is then again mixed with about one hundred parts of water and five parts of hydrochloric or any other acid, and again boiled for about one hour. The water being again evaporated, the product is washed and dried. A small quantity of soapstone and pulverized amber may here be added, but is not necessary to my invention. A suitable coloring-matter, mineral or vegetable, is now added to the preparation. I may take, for example, some burnt vegetable fiber, such as burnt almond-shells or cork, or I may take aniline or other color, according to the shade and color to be produced. At this stage, also, some small threads of silk-waste may be added; but I do not require their use in all cases, and they are not essential in my mixture.

After the composition has been prepared as above stated, I further add to the same some adhesive substance, such as albumen or gelatinous matter, and also some bichromate of potassa, in the proportion of about ten parts of the gelatinous matter to one-third part of the bichromate of potassa.

In order to impart to the preparation the silk or satin like appearance which it is desired to obtain, some pulverized or dissolved metal or alloy, such as bronze, is now added, and the mixture is then subjected to the action of light and the contact with the air, in order to produce oxidation of the metal or alloy. The mixture is now again dried and pulverized. The metal or alloy is added in about the proportions of one-fourth to one-half ounce to one pound of the mixture. The preparation is now ready for the market. Before using it it should be dissolved in water, and a small quantity of adhesive substance should be added, whereupon the mixture may be applied to the printing rollers or plates by which the fabrics are printed in the customary manner. Instead of the almond-shells and cork hereinbefore mentioned, any other short fibrous vegetable substance may be used.

I am aware that bronze-powders have been applied to gelatinous coatings of fabric to produce a metallic surface. This I do not claim. In my mixture the several ingredients, together with the oxidized metal, serve to impart a silk-like luster to the fabric in any color desired.

I claim—

The composition herein described, consisting of powdered almond-shells, water, hydrochloric acid, coloring-matter, gelatine, oxidized metal powder, and bichromate of potassa, substantially in the proportions specified.

G. SCHWARZWALD.

Witnesses:
F. V. BRIESEN,
J. TURK.